July 15, 1958 R. P. SCHERER 2,842,797
FILM FORMING DEVICE
Filed Jan. 16, 1956
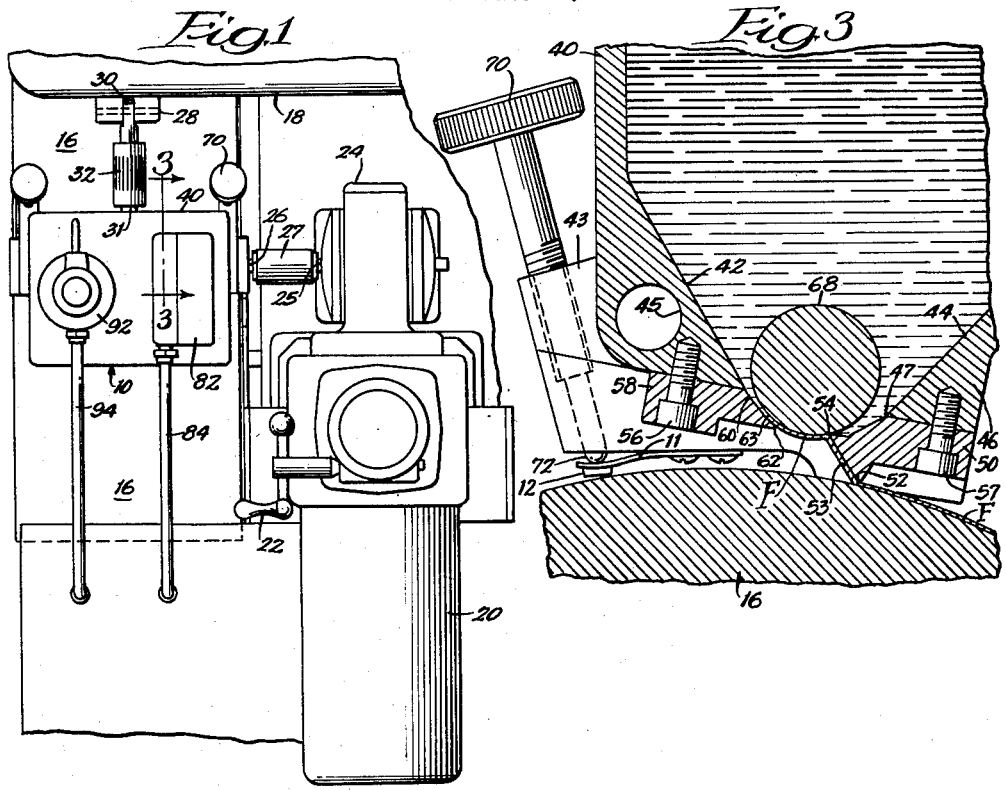
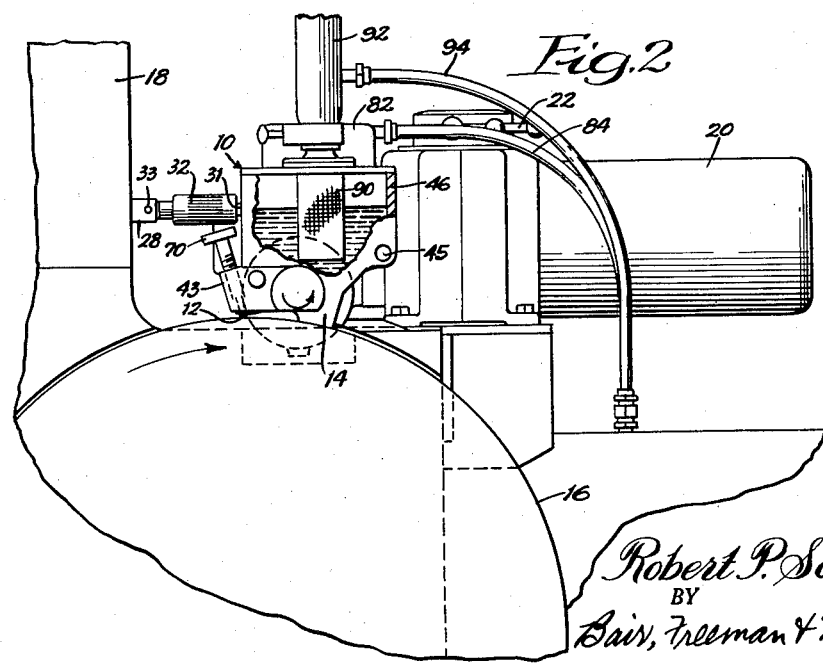
INVENTOR:
Robert P. Scherer,
BY
Bair, Freeman & Molinare
ATTORNEYS.

2,842,797

FILM FORMING DEVICE

Robert Pauli Scherer, Grosse Pointe, Mich., assignor to R. P. Scherer Corporation, Detroit, Mich., a corporation of Michigan Application January 16, 1956, Serial No. 559,175

7 Claims. (Cl. 18—15)

This invention relates to a device for producing high quality films, uniform in thickness and substantially free of air bubbles, from viscous liquid film-forming materials. The invention is suitable for preparing films from a wide variety of viscous liquids such as organic resin solutions, plastisols, organisols and the like. I have found that the invention is particularly well suited for producing films from hot viscous gelatin compositions.

In casting gelatin films in the manufacture of gelatin capsules, it is conventional to deposit the gelatin film on the surface of a rotating drum by gravity flow through a slot in the bottom of a hopper containing the gelatin composition. This method has proved to be reasonably satisfactory, but it is difficult to control accurately the thickness of the cast film. The reason for this is because the gelatin composition does not remain at a constant viscosity. Changes in formulation, temperature, and source of the raw gelatin will produce changes in the viscosity of the gelatin composition. Viscous materials flow more slowly than those of thinner consistency and, consequently, the volume of liquid flowing through the slot in the bottom of the hopper will vary to cause variation in the thickness of the film along its length. To compensate for changes in viscosity it is customary to provide a gate within the hopper which permits increasing or decreasing the width of the slot in the bottom thereof. During operation the gate requires frequent adjustment which results in loss of off-standard gelatin produced during the period of adjustment, and in loss of time by the operator of the machine. The present invention provides means for casting films of uniform thickness from a film-forming composition which may vary considerably in viscosity. No adjustment of any kind is required to maintain the continuous production of a film of uniform thickness.

In a preferred form, the invention consists of a hopper having an elongated slot in the bottom thereof and a rotating roll spaced from one edge of the slot to provide a gap through which the viscous film-forming material is extruded by rotation of the roll. By advancing the viscous material through the gap by means of the rotating roll instead of depending upon gravity, the volume of material passing through the gap remains constant along the entire length of the gap and, consequently, the film formed is of uniform thickness across its entire width and length. If it is desired to increase the thickness of the film, for example, to make gelatin capsules having heavier walls, the thicker film may be produced by increasing the volume of viscous film-forming material advanced through the gap. This may be readily accomplished by increasing the speed of the rotating roll. In other words, the invention provides a method and means for controlled emission of viscous liquid from the discharge slot in the hopper.

In addition to providing films of uniform thickness, I have found that the rotating roll in the hopper surprisingly causes air bubbles to be removed from the viscous liquid before it passes through the gap. If any air at all is present in the extruded film, it is present in the form of bubbles of microscopic size which do not in any way affect the quality of the film deposited. Although I am not certain as to why my device eliminates trapped air, it appears that only the viscous liquid in the hopper provides sufficient friction with the surface of the rotating roll to be advanced thereby. In any event, the bubbles do not pass through the narrow gap between the edge of the slot and the rotating roll. The film, therefore, is smooth, clear, and of uniform density.

Further, in accordance with my invention I provide a scraper or stripping blade on the edge of the slot opposite the discharge gap to remove the film from the roll onto the deposition surface of a rotating drum. Preferably, the stripping blade is very slightly spaced from the roll to permit a very thin film of liquid to remain on the roll, say, less than .002 inch. This thin film facilitates picking up liquid during the next revolution of the roll within the hopper. The space also prevents wear of the roll by the stripping blade.

The invention may be more readily understood by reference to the accompanying drawings, in which:

Figure 1 is a plan view of a device constructed in accordance with the invention shown in connection with a portion of a capsulating machine on which the device is mounted;

Figure 2 is a side view of the apparatus shown in Figure 1 with a part of the hopper broken away to show the interior construction; and Figure 3 is a cross-sectional view taken along the line 3—3 of Figure 1.

The hopper is designated generally by the numeral 10 and consists of a container, generally rectangular in shape, which is preferably formed by casting. The front wall 40 and rear wall 46 of the hopper are internally tapered toward the center at the bottom, as indicated at 42 and 44. Each of the end walls of the hopper terminates at the bottom in a shoe 14 (Figure 2) which has an arcuate bottom surface adapted to ride on the circumferential deposition surface of the drum 16. The shoes support most of the weight of the hopper assembly. The front of the hopper is additionally supported by means of adjustable pins 72. The pins screw into integrally cast ears 43, which project outwardly from the front wall 40 of the hopper. Manual adjustment is facilitated by knurled knobs 70 at the top of each screw. To prevent wearing the surface of the drum 16 and the end of the adjusting pins, I have provided a pair of slide buttons 12 made from soft metal which are connected to the underside of the hopper casting by means of a spring metal leaf 11. The ends of the pins 72 are aligned with the buttons 12. The distance between the bottom of the hopper and the deposition surface of the drum 16 may be adjusted by turning the pins 72.

To prevent the hopper from moving laterally with respect to the drum 16 on which it rides, I have provided a bracket 28 fixed to the back 18 of the capsulating machine. A stud 31 projecting from the back of the hopper is coupled to a finger 30 by means of a sleeve 32, the finger 30 being pivotally secured to the bracket 28 by means of a pin 33.

The longitudinally-extending opening 47 (Figure 3) in the bottom of the hopper casting, formed by the lower terminating edges of the side walls 40 and 46 is narrowed by means of elongated edge members 58 and 50 to form a slot therebetween. Mounted above the slot with its underside adjacent to the edges of the slot is a roll 68. The roll 68 is rotatably mounted at either end in bearings in the end walls of the hopper, and one end thereof terminates in a shaft 26 (Figure 1) which connects to the output shaft 25 of a variable speed drive 24 through a flexible coupling 27. The drive permits adjustment of the speed by infinitely small increments, not "step-wise." The bearing for shaft 26 is suitably sealed to prevent escape of contents from the hopper. The drive also comprises the motor 20 and a crank 22 mounted on a gear box to permit adjusting the speed of the output shaft 25. The motor and variable speed drive are of conventional construction. By this means the roll 68 may be driven at any desired speed.

The edge member 58 is secured to the underside of the portion of the hopper designated by the numeral 42 by means of screws 56. The sloping surface 60 of the member 58 is coextensive with the tapered wall 42 and terminates in a sharp edge 62 which forms one edge of the slot. The distance between the edge 62 and the circumference of the roll 68 defines a gap 63 through which the viscous liquid is discharged. The opposed edge member 50 is secured to the underside of the portion of the hopper designated by the numeral 44 by screws 57 and has two edges 54 and 52. The upper edge 54 serves as a stripping blade and is spaced very slightly from the surface of the roll 68. The lower edge 52 serves as a doctor blade to spread or level out the film on the surface of the drum 16.

As viewed in Figure 2, the deposition drum turns in a clockwise direction while the roll 68 within the hopper turns in a counterclockwise direction. Thus, viscous material within the hopper is continually forced through the gap 63 to produce a film F of plastic material, which is laid on the drum. Friction between the viscous liquid and the roll 68 insures against liquid flowing out between stripping blade 54 and the roll 68. The film F is stripped from the surface of the roll 68 by means of the stripping blade 54. In casting gelatin films, I have found that the discharge gap 63 can be conveniently set at about .010 of an inch, while the distance between the stripping blade 54 and the surface of the roll is set at about .002 inch. While the blade 54 may be fixed in contact with the surface of roll 68 to strip all of the film F off the roll, it is preferred to leave a very thin coating on the roll to facilitate picking up more of the viscous film-forming material as the roll completes its next revolution. The very slight space between the stripping blade 54 and the roll accomplishes this.

A pair of longitudinally-extending bores 45 are provided in the hopper casting near the bottom to serve as housings for electrical heating elements. Some film-forming materials, such as gelatin, can be handled with facility only if the composition is maintained at elevated temperature. Hot gelatin compositions flow more readily from the hopper, and set quickly upon deposition on the relatively cool surface of the rotating drum 16. The set film, of course, is stripped continuously from the drum after it has travelled through an arc of about 270°.

If it is desired to produce films thicker than the width of the gap 63, it is necessary only to increase the speed of the roll 68 by turning the crank 22. It is assumed that the rate at which the drum 16 rotates remains constant, since this rate will affect the thickness of the film. Upon emerging from the gap 63 the film will swell in thickness since the increased speed of the roll forces the material through the gap under pressure. When the speed of the roll 68 is increased so that there is a substantial increase in the thickness of the film, it is also necessary to raise the hopper by turning down the pins 70 which increases the distance betwen the edge of the doctor blade 52 and the surface of the rotating drum 16.

To facilitate filling the hopper with film-forming material to provide continuous flow therefrom, I have provided a filler member 92 which connects through the line 94 to a source of such material. A strainer 90 is provided within the hopper beneath the filler to strain out any large particles or foreign material that may be present in the viscous material. The flow of liquid into the tank is automatically controlled by conventional means within housing 82 through conductors 84.

Although I have described and illustrated one form of my invention, it will be apparent to those skilled in the art that variations and modifications can be made without departing from the true spirit and scope of my invention. It is, therefore, my intention not to limit the invention otherwise than as necessitated by the scope of the appended claims.

What I claim as new and desire to secure by Letters Patent of the United States is:

1. A device for forming films from viscous liquids comprising a hopper adapted to ride on the deposition surface of a drum with its bottom spaced therefrom; a longitudinally-extending slot having two parallel edges through said bottom of the hopper; a roll mounted within said hopper adjacent said edges for rotation in the direction of flow through said slot, one of said edges being spaced from said roll to form a gap through which a film of viscous liquid is discharged, the rate of rotation of said roll being variable to control the volume of liquid discharged, the other of said edges forming a stripping blade for removing the film from said roll to the deposition surface of said drum, and a doctor blade spaced above said deposition surface to level the deposited film.

2. The device of claim 1 wherein said stripping blade is very slightly spaced from said roll to permit a thin coating of said liquid to remain on said roll to facilitate pick up of fresh liquid during the next revolution of the roll.

3. The device of claim 1 wherein said discharge gap is about .010 inch wide and said stripping blade is spaced about .002 inch from said roll to permit a thin coating of said liquid to remain on said roll to facilitate pick up of fresh liquid during the next revolution of the roll.

4. The device of claim 1 including power means for rotating said roll.

5. The device of claim 1 including power means for rotating said roll and variable speed adjustment means between said power means and said roll.

6. A device for forming uniform films from viscous liquids comprising a hopper supported above the deposition surface of a rotating drum by shoes adapted to ride on said surface; a longitudinally-extending slot having two parallel edges in the bottom of said hopper; a roll rotatably mounted within said hopper with its underside adjacent said edges, one of said edges being spaced from said roll to form a gap through which a film of viscous liquid is discharged, the rate of rotation of said roll being variable to control the volume of liquid discharged, the other of said edges forming a stripping blade for removing said film from said roll; and a doctor blade associated with said other edge for leveling the film on said deposition surface.

7. The device of claim 6 wherein said hopper is vertically adjustable to regulate the distance between said doctor blade and said deposition surface.

References Cited in the file of this patent

UNITED STATES PATENTS

| | | |
|---|---|---|
| 1,583,484 | Morrison et al. | May 4, 1926 |
| 2,234,964 | Czapek | Mar. 18, 1941 |
| 2,249,507 | Van Derhoef | July 15, 1941 |
| 2,318,469 | Derby et al. | May 4, 1943 |

FOREIGN PATENTS

| | | |
|---|---|---|
| 414,535 | Great Britain | Aug. 9, 1934 |